United States Patent [19]

Boyer et al.

[11] Patent Number: 4,930,605
[45] Date of Patent: Jun. 5, 1990

[54] BRAKE APPARATUS WITH BLIND CABLE INSTALLING MEANS

[75] Inventors: Billy G. Boyer, Moberly; Lloyd M. Nelson, Blackwater; Wayne L. Soucie, Columbia; William K. Hayes, Fayette, all of Mo.

[73] Assignee: Orscheln Co., Moberly, Mo.

[21] Appl. No.: 349,033

[22] Filed: May 9, 1989

Related U.S. Application Data

[63] Continuation of Ser. No. 275,390, Nov. 23, 1988, Pat. No. 4,872,533.

[51] Int. Cl.⁵ .............................................. F16D 51/00
[52] U.S. Cl. .................................... 188/2 D; 188/328; 188/106 A; 267/179; 267/180
[58] Field of Search ............... 188/2 D, 325, 328, 331, 188/106 A, 106 R, 106 F, 106 P, 316, 382, 361, 344, 78; 29/402.01, 402.08; 192/75, 99 B; 403/194, 197, 195, 196; 74/506.5, 501.5 R, 501.5 H, 501.6, 502, 502.4, 502.5, 502.6; 267/179, 180

[56] References Cited

U.S. PATENT DOCUMENTS

| 1,723,986 | 8/1929 | Wallace | 188/2 D |
|---|---|---|---|
| 1,757,437 | 5/1930 | Muldgon | 267/180 |
| 1,948,268 | 2/1934 | Kitto | 267/180 |
| 2,550,669 | 5/1951 | Brickman | 74/502.5 |
| 2,850,915 | 9/1958 | Bratz | 74/502.5 |
| 3,101,205 | 8/1963 | Benham | 188/2 D |
| 3,661,233 | 5/1972 | Margetts et al. | 188/106 A |
| 4,364,456 | 12/1982 | Colpaert | 188/106 A |
| 4,595,084 | 6/1986 | Le Deit | 188/328 |
| 4,753,325 | 6/1988 | Jaksic | 188/106 A X |

FOREIGN PATENT DOCUMENTS 52388  3/1944  France ............................ 74/502.5

Primary Examiner—Andres Kashnikow
Assistant Examiner—Matthew C. Graham
Attorney, Agent, or Firm—Laubscher, Presta & Laubscher

[57] ABSTRACT

A parking brake assembly of the blind-cable-connection type including a backing plate containing an opening, a helical guide spring arranged to guide a flexible resilient inner cable member toward a ramp surface on a parking brake lever for the blind connection to the inner cable member to the lever, characterized in that the angle of inclination of the ramp surface relative to the cable axis is contained in a plane that is both parallel with the longitudinal axis of the lever and that is inclined at an acute angle relative to the axis of the inner cable member. This construction permits the parking brake lever to be simply and economically formed from a blank of flat metal stock, the cable-retaining slot being defined by a slot contained between bifurcated portions of the ramp surface. The helical guide spring includes portions having tightly wound turns, thereby to assist in connecting the spring with the backing plate and/or with the parking brake lever.

4 Claims, 7 Drawing Sheets

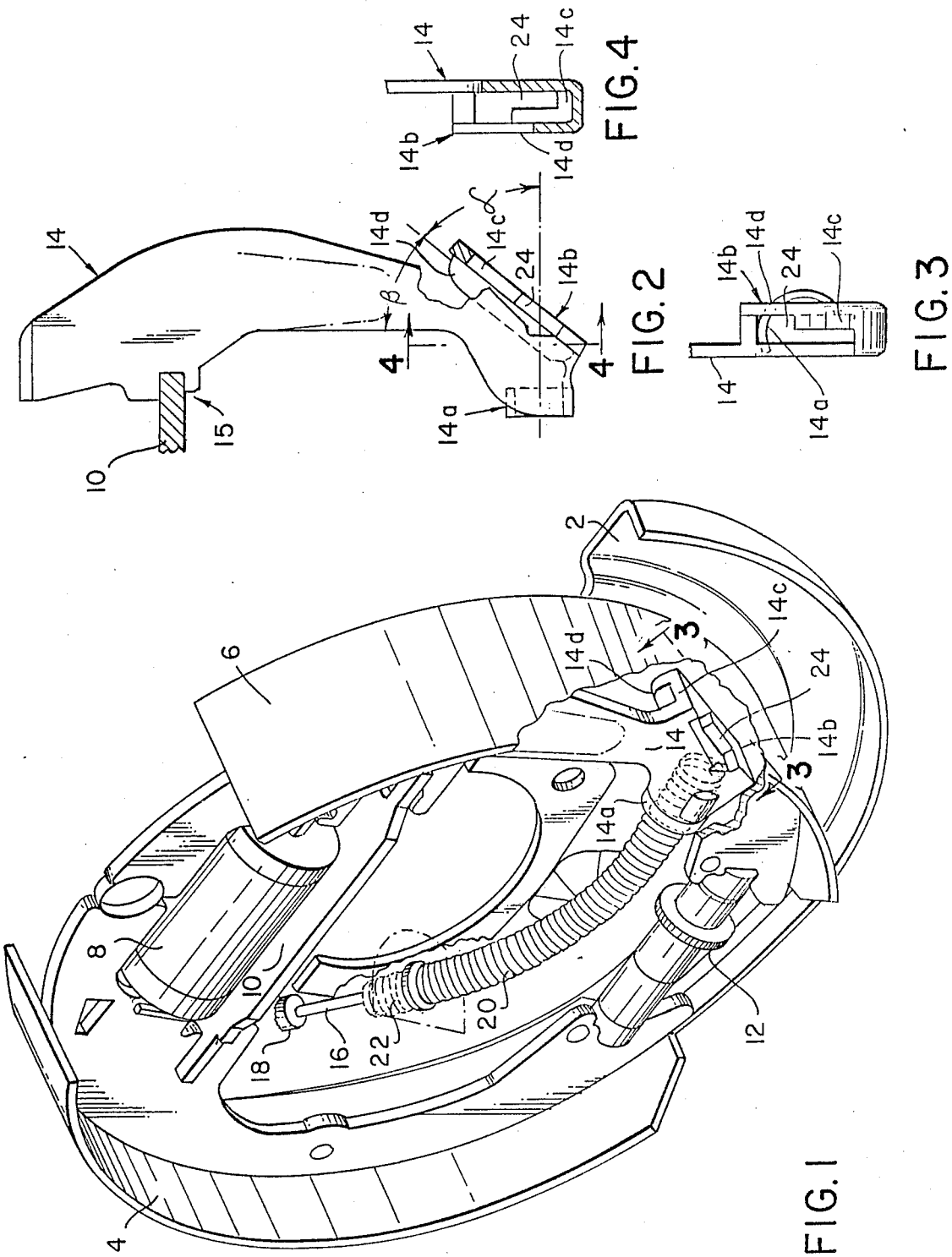

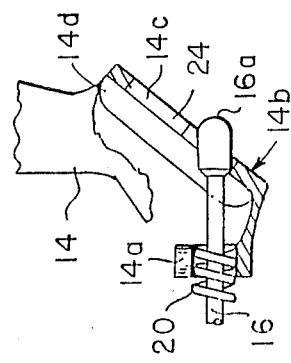
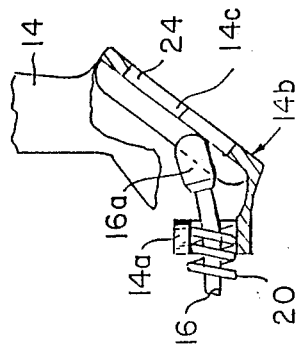
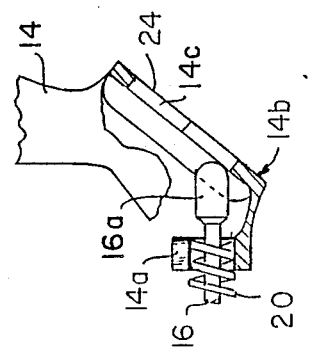
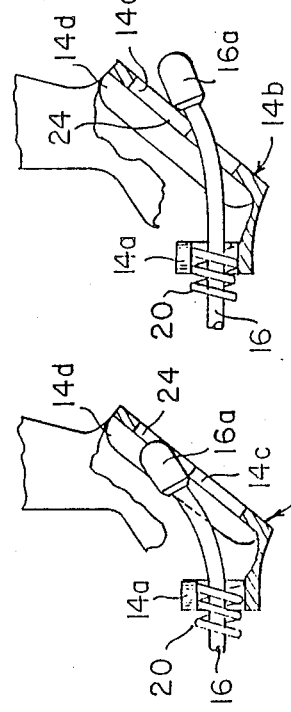
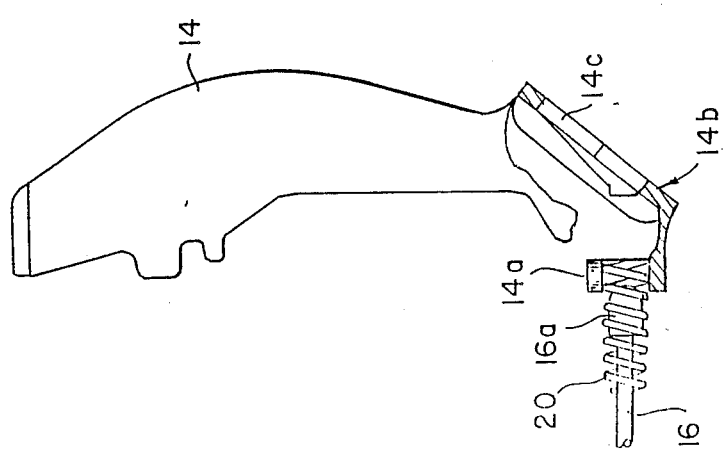

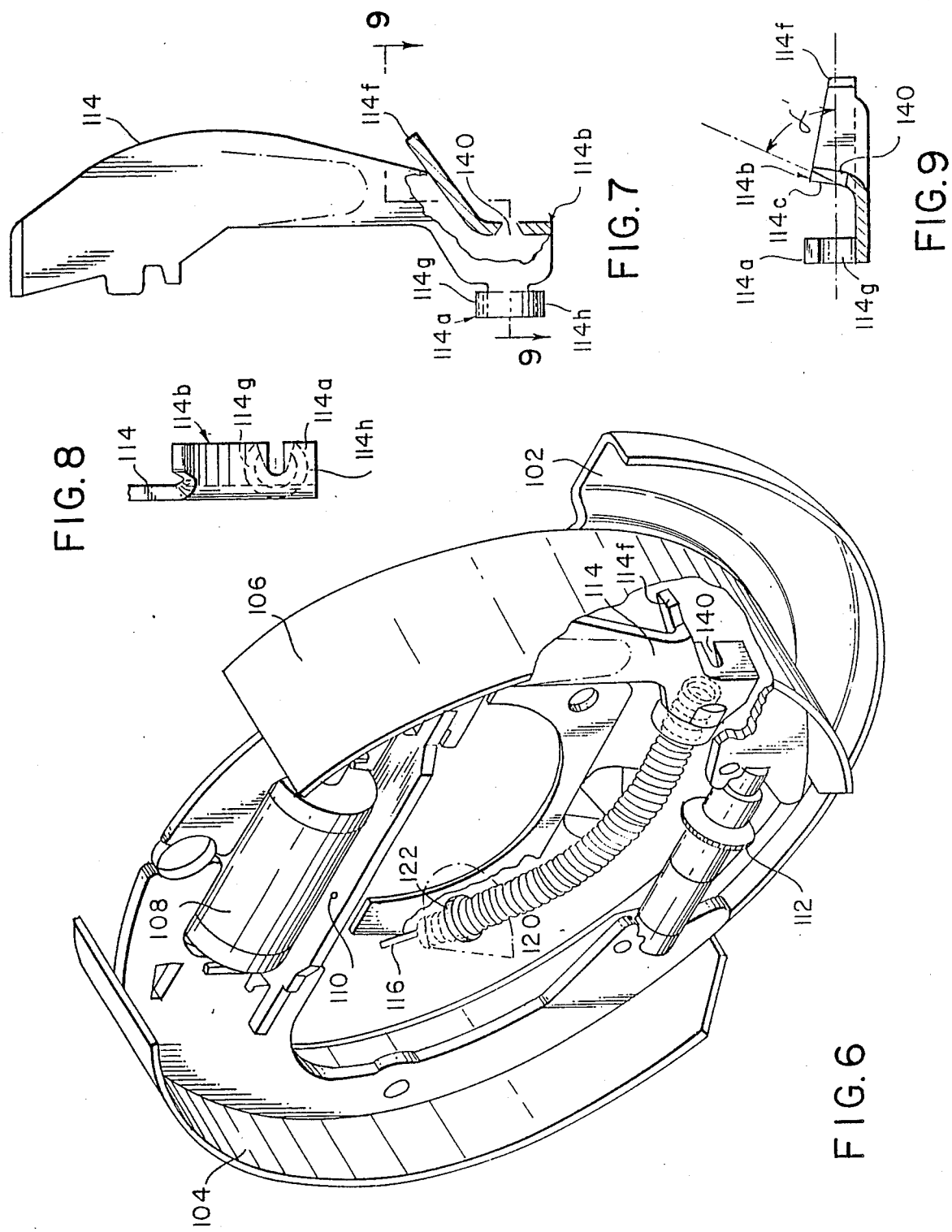

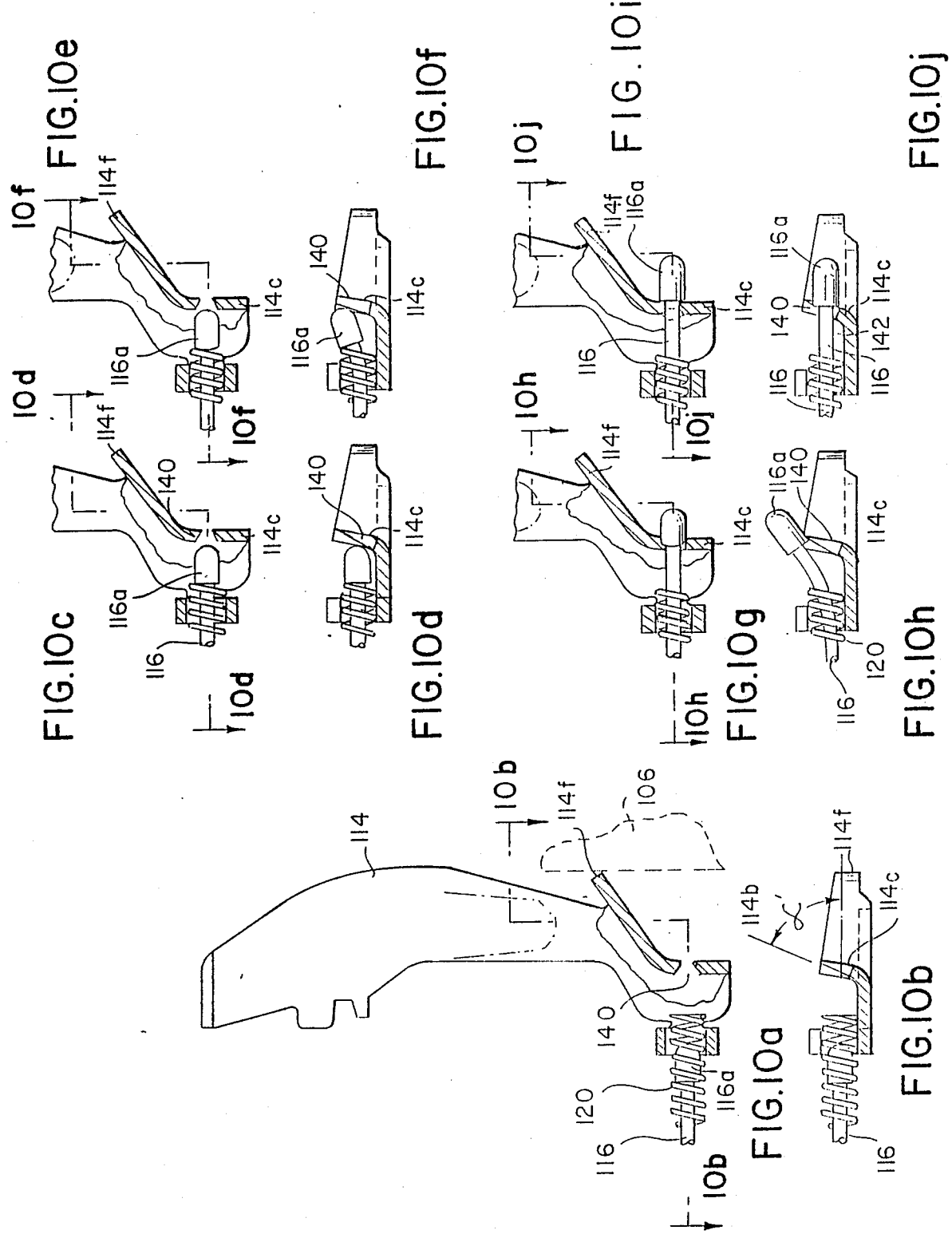

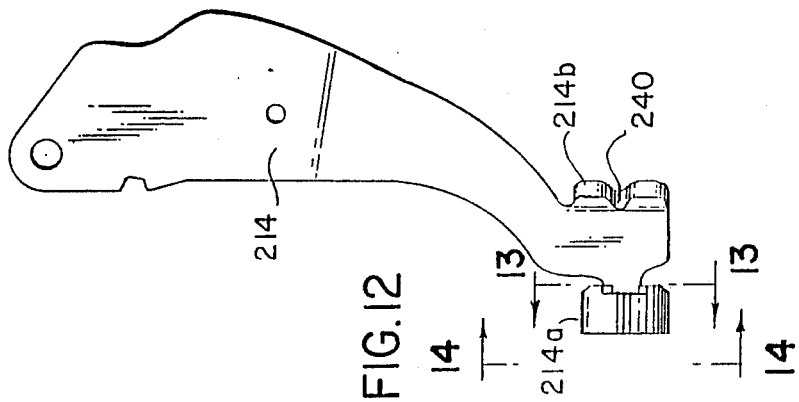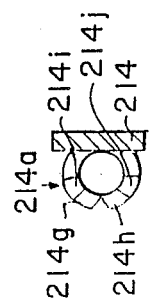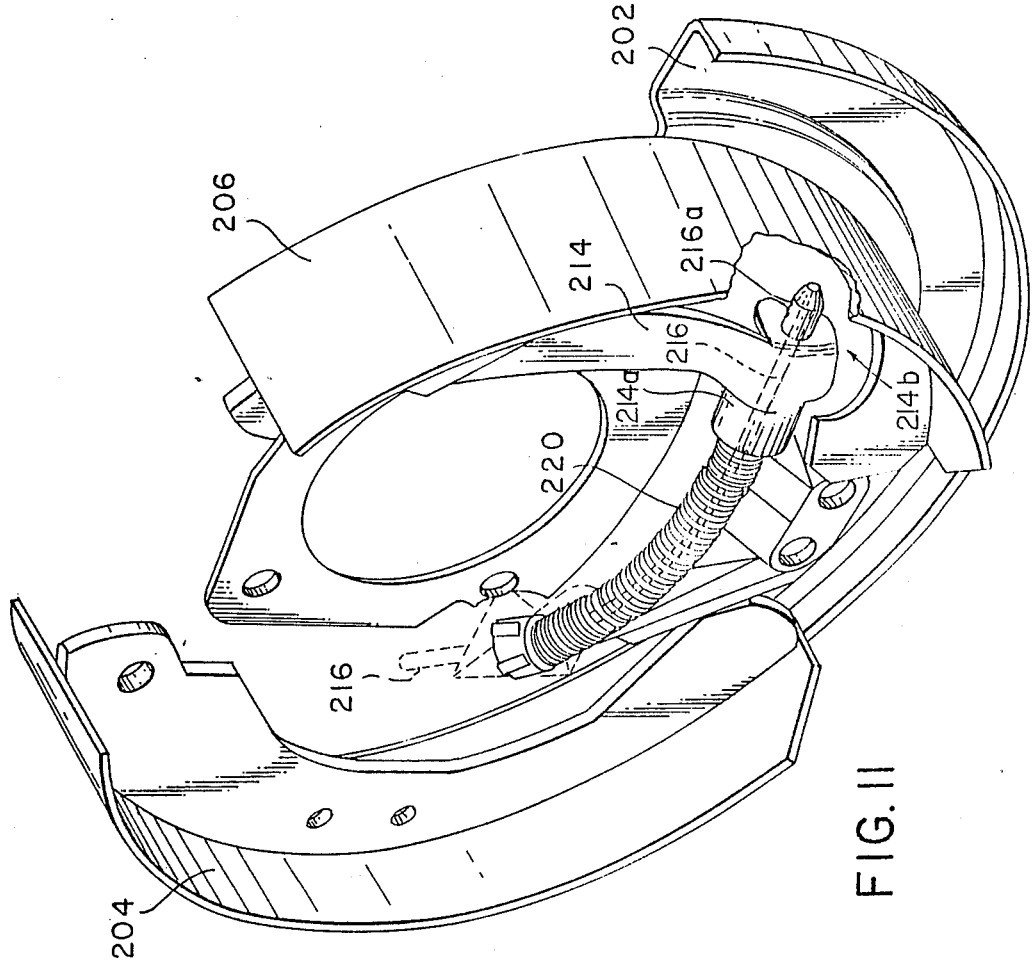

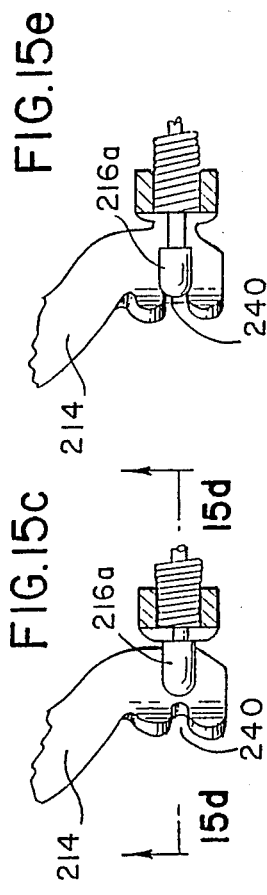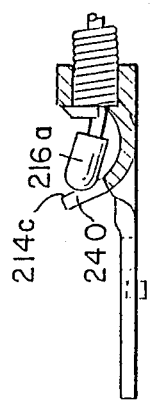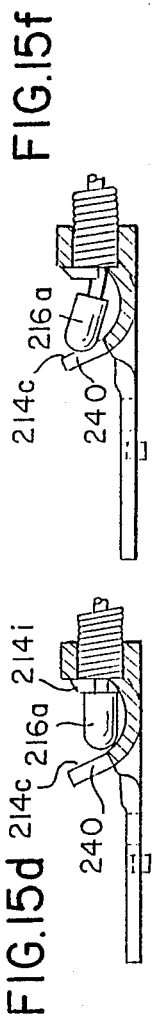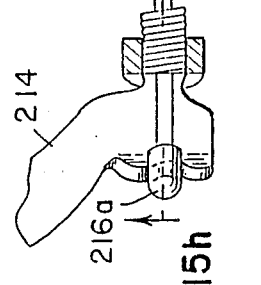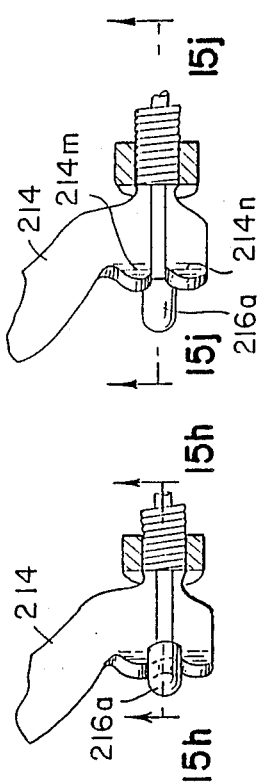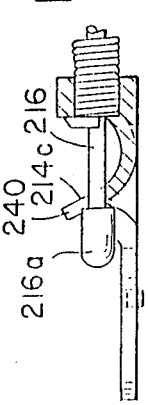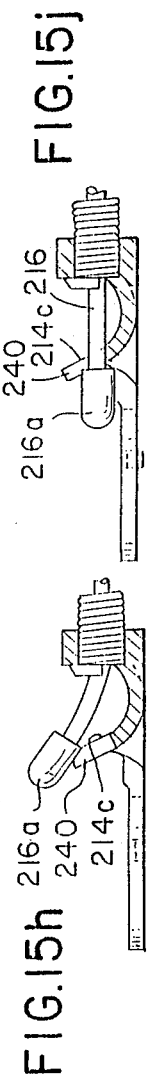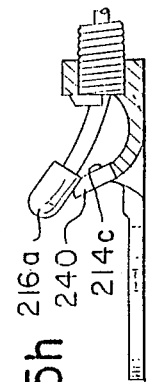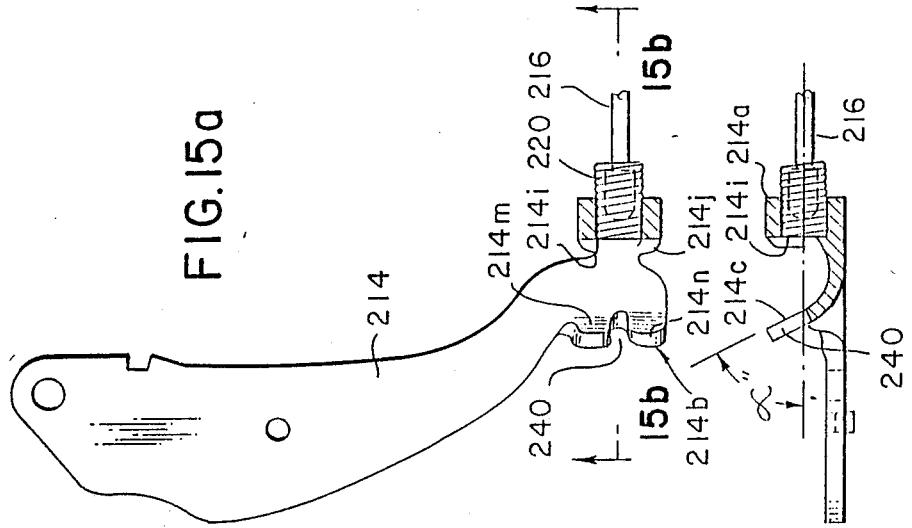

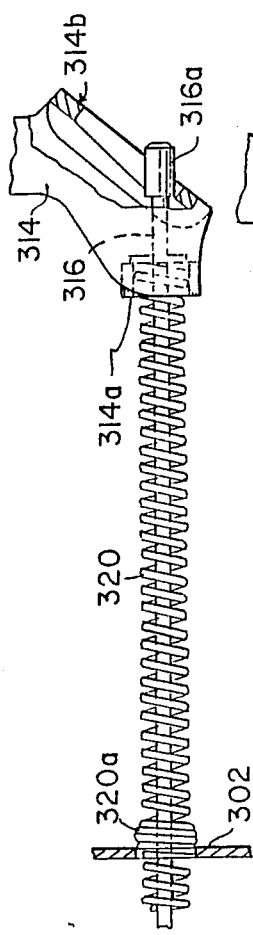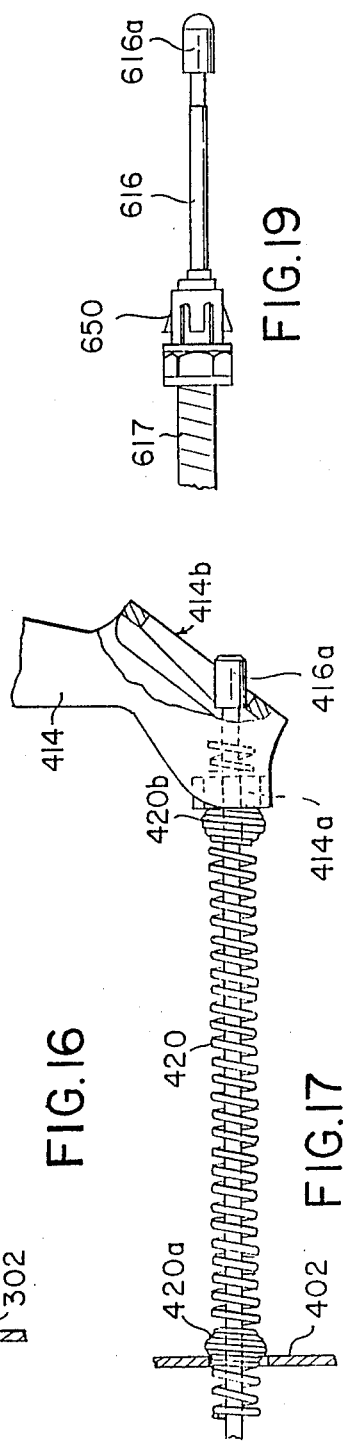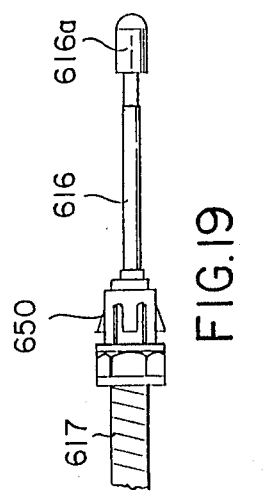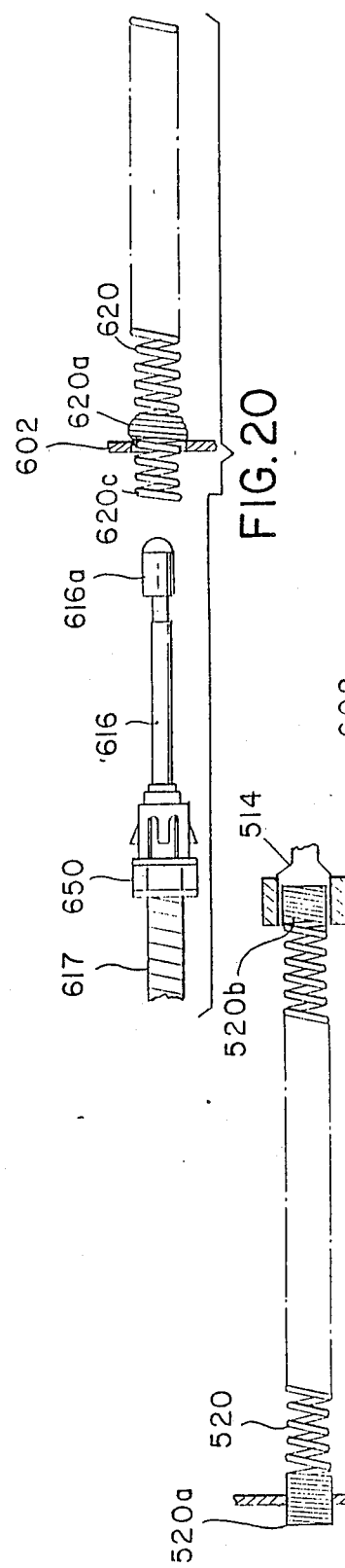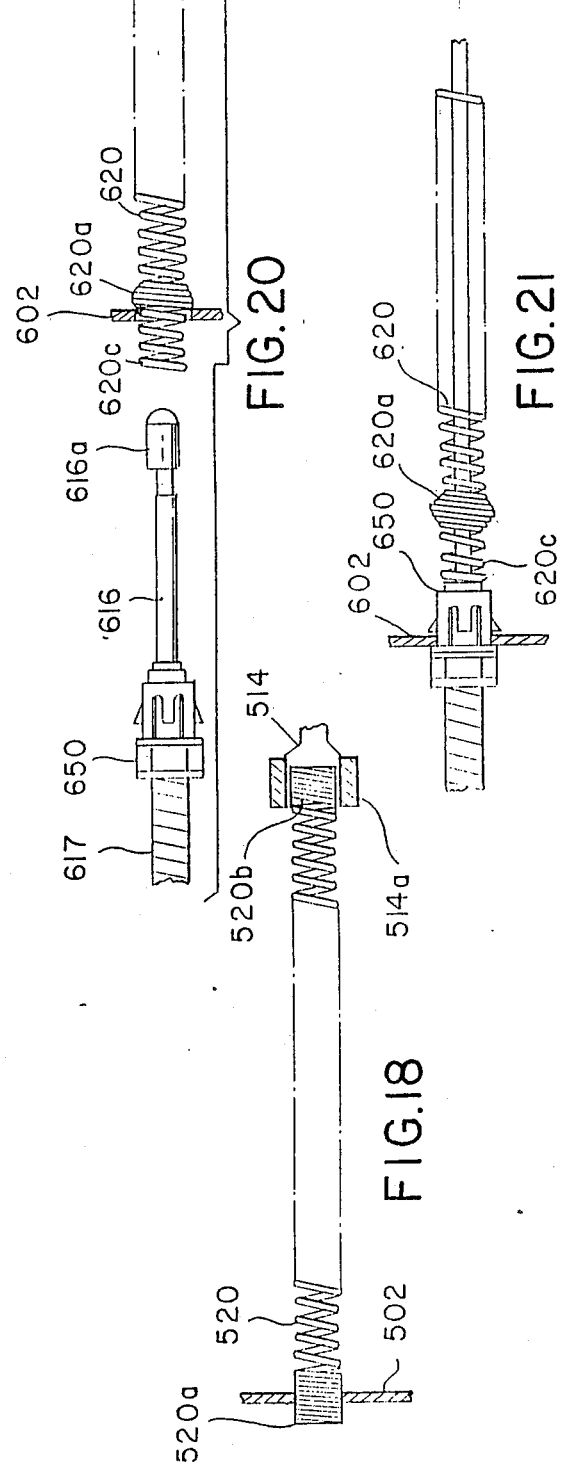

BRAKE APPARATUS WITH BLIND CABLE INSTALLING MEANS

REFERENCE TO RELATED APPLICATION

This application is a continuation of the prior Boyer et al application Ser. No. 275,390 filed Nov. 23, 1988 now U.S. Pat. No. 4,872,533.

STATEMENT OF THE INVENTION

This invention relates to an improved parking brake arrangement of the blind cable installation type including improved ramp means for automatically connecting the inner brake cable member with the parking brake lever, characterized in that the angle of inclination of the ramp surface is contained in a plane that is normal to the plane of the lever and which contains the axis of the cable member, whereby the parking brake lever may be simply and economically fabricated from a blank of flat metal stock, and which affords simple assembly and disassembly of the parking brake cable. Use is made also of a helical guide spring having portions of tightly wound turns, so arranged as to improve the connection of the spring with the backing plate and/or with the parking brake lever.

BRIEF DESCRIPTION OF THE PRIOR ART

In the prior Jaksic patent No. 4,753,325, a parking brake assembly is disclosed in which blind cable connecting means are provided for connecting a flexible resilient parking brake cable with a parking brake lever, use being made of a helical guide spring for guiding the cable toward an inclined ramp surface on the lever. As the extremity of the cable end progressively rides up the ramp surface during insertion of the inner cable member via the guide spring, a position is reached in which the cable extremity extends through an opening in the ramp surface, whereby the cable is introduced into a retaining slot to automatically connected the cable end with the lever. In this Known construction, the fabrication of the ramp portion of the lever is rather complex and requires a number of manufacturing steps, owing to the provision of a rather unique slot configuration in the ramp surface, and the requirement for a curved wall surface with a retaining lip extremity for maintaining the cable extremity in line during the blind assembly of the parking brake cable. Thus, the manufacture of the parking brake lever requires a relatively large number of manufacturing steps, thereby increasing the resulting cost of the lever. Furthermore, owing to the provision of the aforementioned curved wall with the overhanging retaining lip, disassembly of the cable member from the lever is most awkward and difficult to achieve.

The present invention was developed to avoid the above and other drawbacks of the known blind parking brake assembly, and to provide an improved construction in which the parking brake lever is easily and economically fabricated from a blank of flat metal stock.

SUMMARY OF THE INVENTION

A primary object of the present invention is to provide an improved parking brake assembly of the blind cable connection type in which the parking brake lever is formed from a blank of flat metal stock and includes an inclined ramp surface contained in a plane that is parallel with the axis of the lever and inclined at an acute angle relative to the axis of the cable, the ramp being bifurcated in a simple manner to define a slot that receives the cable member when in the connection condition. A pair of cooperating semi-circular arms integral with the lever define a generally annular spring support portion spaced forwardly of the ramp surface, which support portion receives one end of the guide spring.

According to another object of the ivention, the guide spring includes portions of compacted tightly-wound coil turns for improving the connection of the spring to the lever and/or the backing plate. In one embodiment, the tightly wound turns are provided at the ends of the spring. Thus, the turns of the spring portion that extend through the opening in the backing plate are tightly wound to prevent lateral movement of the spring relative to the opening. At the other end, the tightly wound turns enhance the entry of the spring end into the generally annular spring support portion of the lever. In a second spring embodiment, the tightly wound turns define bell-shaped portions of enlarged outer diameter spaced from the associated spring ends. Thus, one bell-shaped portion limits the extend of outward travel of the spring relative to the backing plate opening in which the spring is mounted, and the other bell-shaped portion limits the extent to which the spring enters the annular spring support portion of the lever.

A further object of the invention is to provide a lever construction having the aforementioned bifurcated ramp structure, whereby the flexible parking brake cable member may be readily connected and disconnected from the lever.

According to another object of the invention, the lever is fabricated from a blank of flat metal stock by a limited number of simple pressing, forming and machining steps, thereby reducing the cost of the lever. According to the preferred embodiment, the annular spring support portion on the lever is formed from two oppositely extending tabs that are rolled to define cooperating semi-circular arms. In order to limit movement of the spring end relative to this spring support portion, the semi-circular arms may be provided with radially inwardly extending tabs that serve as stops for the springs.

According to a further feature of the invention, the ramp portion of the lever includes an integral extension arranged to abut the associated brake shoe during the blind assembly of the cable to the ramp portion, thereby spacing the ramp portion from the shoe to a sufficient extent to permit the cable extremity to ride over the peak of the ramp and to permit entry of the cable member into the retaining slot contained in the ramp.

Still another object of the invention is to provide a blind entry cable installation arrangement in which the manufacturer is permitted to completely assemble the brake assemblies and drums to the axle housing member at one location and to install the flexible cable member at another time or location, thereby virtually eliminating the possibility of damaging parts and eliminating the need for costly and time consuming reworking to remove and replace the damaged parts, resulting in a considerable cost savings to the manufacturer.

A further object of the invention is to provide a mechanical brake actuating lever means that is simple and economical to manufacture and assemble and that is readily adaptable to a variety of brake type and size applications.

BRIEF DESCRIPTION OF THE DRAWINGS

Other objects and advantages of the invention will become apparent from a study of the following specification, when viewed in the light of the accompanying drawings, in which:

FIG. 1 is a perspective front view of a modification of the prior art parking brake apparatus with blind cable connecting means.

FIG. 2 is a front elevational view of the parking brake lever of FIG. 1;

FIG. 3 is a detailed right side view of the lever taken along line 3—3 of FIG. 1;

FIG. 4 is a sectional view taken along line 4—4 of FIG. 2;

FIG. 5a-5f are detailed front elevational views, with certain parts broken away for clarity, illustrating the manner of blind cable connection of the flexible inner brake cable member with the lever of FIGS. 1-4;

FIG. 6 is a perspective front view of the improved parking brake assembly of the present invention;

FIGS. 7 and 8 are front elevation and right side views, respectively, of the parking brake lever of FIG. 6;

FIG. 9 is a sectional view taken along line 9—9 of FIG. 7;

FIGS. 10a-10j are detailed elevation and corresponding sectional views respectively, illustrating the blind cable connection of the inner brake cable member to the lever of FIG. 6;

FIG. 11 is a perspective view of a modified second embodiment of the improved parking brake apparatus of the present invention as applied to one rear wheel of the vehicle;

FIG. 12 is a front elevational view of a reversed modification of the lever of FIG. 11 as adapted for use with the other rear wheel of the vehicle, and FIGS. 13 and 14 are sectional views taken along lines 13—13 and 14—14 of FIG. 12, respectively;

FIGS. 15a-15j are detailed elevation and companion sectional views respectively, illustrating the blind cable connection of the inner brake cable member to the lever of FIG. 11;

FIGS. 16 and 17 illustrate parking brake lever and cable assemblies including first and second guide spring embodiments, respectively;

FIG. 18 illustrates a third guide spring embodiment arranged between a backing plate and the associated parking brake lever; and FIGS. 19-21 illustrate the manner in which the guide spring is longitudinally compressed during the connection to the backing plate of a self-connecting fitting on an outer conduit member.

DETAILED DESCRIPTION

Referring first more particularly to FIGS. 1-4, the brake apparatus for a vehicle includes a stationary backing plate 2 to which are connected a pair of brake shoes 4 and 6 that are operable by a conventional brake cylinder 8. Arranged between the brake shoes is a rigid strut element 10, and conventional threaded adjusting means 12 are connected with the brake shoes on the opposite side of the strut member from the brake cylinder 8. A parking brake lever 14 is pivotally mounted on the strut member 10 for operating the brake shoes toward a locked condition, said parking brake lever being pivotally operable about pivot axis 15 by the inner cable member 16 of a parking brake cable assembly including an outer conduit member 18. The inner cable member extends longitudinally through a helical guide spring 20 that extends at one end through an opening contained in the backing plate 2, and the other end of the spring being connected with a transversely arranged spring support portion 14a integral with the parking brake lever 14. Spaced from the spring support portion 14a is a ramp portion 14b including an inclined ramp wall 14c having a ramp surface that extends at an acute angle $\alpha$ to the axis of the spring support portion 14a, as shown in FIG. 2, said ramp surface also being inclined at an acute angle by the complementary angle $\beta$ to the longitudinal axis of lever 14. Thus, as shown in FIG. 4, the ramp portion 14b has a generally U-shaped cross-sectional configuration and includes a ramp wall 14c which contains a vertical slot 24 that receives the inner cable member 16 when the cable is connected with the ramp portion 14b, as will described below.

Referring now to FIGS. 5a-5f, to connect the inner cable member with the lever 14, the enlarged extremity 16a of the inner cable member 16 is progressively introduced via the guide spring 20 until it passes through the annular spring support portion 14a of the lever 14 as shown in FIG. 5a. When the rounded extremity of the inner cable member 16 engages the ramp wall surface 14c as shown in FIG. 5b, the extremity 16a is guided up the ramp surface 14c as shown in FIGS. 5b and 5c. When the cable extremity 16a enters the enlarged upper end of slot 24 as shown in FIG. 5d, the enlarged portion 16a rides over the corresponding edge of the slot and the cable, owing to its inherent resiliency, returns to its original linear configuration as shown in FIGS. 5e and 5f, whereupon the enlarged extremity 16a seats in a corresponding recess contained in the ramp portion 14b, thereby to lock the inner cable member 16 with the lever 14, as shown in FIG. 5f. Following connection of the inner cable member to the lever, tensioning of the cable causes lever 14 to pivot in the clockwise direction about the pivot axis 14 defined by the strut 10, thereby to displace the brake shoes outwardly toward positions in locking engagement with the associated brake drum.

As shown in FIGS. 5b-5f, the end extremity 16a of the inner cable member is contained between the parallel surfaces of the tab portion 14b and the lever 14 as the cable is displaced toward the locked condition shown in FIG. 5f, and therefore the inner cable member is relatively inaccessible in the event it should be wished to disassemble the same from the parking brake lever 14. The lever 14 is preferably fabricated from a blank of flat metal stock, a relatively large number of folding and pressing steps being required to form the slotted ramp portion 14 of the lever. Furthermore, the generally annular spring support portion 14a is formed by bending a single tab member into a generally circular configuration, thereby to define an axial opening for receiving the corresponding end of the helical guide spring 20.

Referring now to FIGS. 6-9, the improved parking brake apparatus of the present invention includes an improved parking brake lever 114 that is pressed and formed from a blank of flat metal stock and includes at one end a generally annular spring support portion 114a, and a ramp portion 114'b. The transversely arranged annular spring support portion 114a includes a pair of integral arm portions 114g and 114h (FIG. 8) that are bent to define cooperating semi-circular configurations, thereby to define a generally annular opening for receiving the associated end of the helical guide spring 120. The ramp wall surface 114c has an angle of inclination α' relative to the axis of the spring support portion 114a, as shown in FIG. 9, said ramp surface being contained in a plane generally parallel with the longitudinal axis of lever 114. This ramp wall 14c is bifurcated by means of a simple slot opening 140 that extends downwardly from the upper edge of the ramp wall 114c.

In accordance with an important feature of this embodiment, the ramp portion 114b includes an extension 114f that extends outwardly from the right hand side of the lever as shown in FIGS. 7 and 10a thereby to engage the associated brake shoe 106 to space the ramp wall 114c from the brake shoe and to permit the connection of the inner brake cable member 116 to the lever 114. More particularly, as the inner brake cable is progressively introduced through the end portion of the helical. guide spring 120, though the opening 122 in the backing plate, through the guide spring 120, and through the spring support portion 114'a, the enlarged extremity 116a engages the ramp surface 114c, as shown in FIGS. 10c and 10d, whereupon the rounded extremity 116a rides up the ramp surface 114c, as shown in FIGS. 10e and 10f. Further insertion of the inner cable member 116 causes the enlarged portion 116a to ride over the upper edge of the ramp wall 114 (FIGS. 10g and 10h), whereupon the inner cable member 116 is laterally displaced downwardly through the slot 140 to the position of FIGS. 10i and 10j, whereupon the enlarged head portion 116a reaches a seated position behind the bifurcated ramp portion 114c, and is retained in this position as shown in FIG. 10j. The inner cable member is now connected with the parking brake lever 114, whereupon tensioning of the inner cable member 116 causes pivtal movement of the lever 114 to lock the brake shoes against the associated drum.

It is important to note that in the improved embodiment of FIGS. 6-10, the inner cable member may be readily disassembled from the parking brake lever. More particularly, as shown in FIG. 10j, there is provided a space 142 between the inner cable member 116 and the adjacent lever surface, thereby to permit the insertion of a suitable screwdriver, awl or the like to lift the inner cable member to the position of FIG. 10h, whereupon the inner cable member 116 may be laterally displaced from the lever 114, and may be longitudinally withdrawn from the brake assembly via the helical guide spring 120. During the assembly and disassembly of the apparatus, the ramp wall 114c is maintained spaced from the associated surface of the brake shoe 116 by the extension 114f, as shown in phantom in FIG. 10a, whereby interference with the enlarged end portion 116a by the brake shoe 106 is avoided.

Referring now to the second embodiment of FIGS. 11-15, the generally-annular spring support portion 214a is defined by a pair of cooperating semi-circular tab portions 214g and 214h, as in the previous embodiment. In order to limit the extent of travel of the helical guide spring 220 in the direction of the inclined ramp portion 214b, the arms 214g and 214h are provided with radially inwardly directed stop tabs 214i and 214j, respectively, as shown in FIG. 13. Thus, the stop tabs limit the extent of insertion of the srping 220, as shown in FIG. 15a. Referring to FIG. 15b, the ramp surface is inclined to the axis of the spring support portion 214a by the acute angle α", which ramp surface is contained in a plane generally parallel with the longitudinal axis of the lever 214. As shown in FIGS. 15c-15j, in order to connect the inner cable member 216 to the parking brake lever 214, the cable is progressively introduced via the guide spring to cause the enlarged extremity 216a to ride up the inclined ramp surace 214c until the enlarged extremity rides over the upper edge of the inclined ramp wall 214c (as shown in FIG. 15h), whereupon the inner cable member 216 is received by the slot 240, and the enlarged head portion 216a is 0eated behind the inclined ramp wall 214c, thereby to connect the inner cable member 216 with the parking brake lever 214.

It will become apparent that the parking brake lever 214 is formed from a blank of flat metal stock by a minimum number of simple pressing and forming steps. Thus, the inclined wall 214c is deformed upwardly from the plane of the lever 214, whereupon the slot 240 is machined in the ramp wall 214c to define the bifurcated portions 214m and 214n. The spring support portion 214a is formed merely by bending upwardly in a semi-circular configuration the integral arm portions 214g and 214h. Thus, the parking brake lever is formed by a limited number of manufacturing operations, and at a minimal cost.

In accordance with another important feature of the invention, the helical guide spring is provided with selected portions having tightly wound turns, thereby to improve the connection of the spring with the backing plate and/or the parking brake lever. Referring to FIG. 16, it will be noted that the spring 320 is provided with a bell-shaped enlarged portion 320a of tightly wound turns adjacent the backing plate 302, thereby to limit the extent of travel of the spring outwardly of the backing plate. At its right hand end, the spring 320 extends within the spring support portion 214a of the parking brake lever 314.

In the modification of FIG. 17, the spring includes bell shaped portions 420a and 420b spaced from the spring ends, thereby to limit the outward extent of travel of the spring 420 relative to the backing plate 402, and the inward extent of travel of the spring relative to the spring support portion 414a of the parking brake lever 414. Thus, the spring is accurately positioned and maintained connected with the backing plate 402 and the parking brake 414 when in the assembled condition of FIG. 17.

Referring now to FIG. 18, the spring is provided at one end extremity with a tightly wound portion 520a that extends within the backing plate opening, and at the other end the spring includes a tightly wound extremity 520b that extends within the generally annular spring support portion 514a of a parking brake lever 514. Owing to the tightly wound turns of the portion 520a, lateral displacement of the spring relative to the opening in the backing plate 502 is prevented, and at the other end, the tightly wound spring portion 520b permits simple entry of the spring end within the annular spring support 514a.

In each of the spring embodiments, the spring extends to some extent at one end through the opening contained in the backing plate. Referring to FIGS. 19-21, the outer conduit member 617 is provided with a self-connecting fitting 650 as is known in the art, for example, as shown by the Gordy et al Reissue Patent No. 30,850. As shown in FIG. 20, the enlarged end extremity 616a of the inner cable member is introdced into the protruding end portion 620c of the spring 620, whereupon the parking brake conduit is progressively introduced until the fitting 650 is snapped within the opening contained in the backing plate 602, as shown in FIG. 21. It will be noted that the spring 620 has been compressed by the fitting 650 to the point that the bell-shaped portion 620a and the end portion 620c of the spring 620 are now on the right hand side of the backing plate 620 of FIG. 21.

Consequently, the spring 620 has been changed from the non-compressed condition of FIG. 20, to the compressed condition shown in FIG. 21, thereby bias the parking brake lever toward the brake release condition.

While in accordance with the Patent Statutes the preferred forms and embodiments of the invention have been illustrated and described above, it will become apparent that various changes can be made without deviating from the previously set forth inventive concepts.

What is claimed is:

1. A blind-cable type parking brake assembly for operating brake shoe means relative to a brake surface associated with a wheel of a vehicle, comprising:
   (a) a backing plate;
   (b) a parking brake lever mounted for pivotal movement relative to said backing plate, said lever including spring support means adjacent one end thereof;
   (c) a helical guide spring supported at one end by said spring support means, said spring extending, when in its initial normal non-compressed condition, at its other end through, and terminating at an extremity arranged slightly beyond an opening contained in said backing plate, said spring including a bell-shaped portion of enlarged outer diameter having turns that are tightly wound relative to the remaining portion of the spring, said bell-shaped portion being in engagement with the side of said backing plate adjacent said lever, thereby to limit the extent of longitudinal diplacement of said spring away from said lever;
   (d) a coaxial parking brake cable assembly including a flexible resilient inner cable member terminating at one end in an enlarged extremity; and
   (e) means connecting said inner cable member one end with said lever one end, said lever one end including a ramp portion spaced from said spring support means on the side thereof remote from said backing plate opening, said ramp portion having an inclined ramp surface facing said spring support means, said ramp portion containing a cable mounting opening so arranged and of such a size and configuration that said enlarged inner cable member extremity is operable for successive introduction through said spring, through said backing plate opening, and through said spring support means into sliding engagement with said ramp portion, whereby during the blind connection of said inner cable member with said lever, the end portion of said inner cable member initially rides up said ramp portion and subsequently extends through the ramp opening for resilient return toward a connected position in which the inner cable member is retained in said mounting opening by the engagement of said enlarged extremity with the rear surface of said ramp portion;
   (f) said parking brake assembly further including an outer sleeve member (617), and self-connecting fitting means (650) mounted on said sleeve member for engaging said terminal spring portion to compress said spring longitudinally and for connecting said sleeve member with said backing plate opening.

2. Apparatus as defined in claim 1, wherein said spring support means is generally annular; and further wherein said spring includes a second tightly wound bell-shaped portion of enlarged outer diameter intermediate said spring support means and said backing plate, said second bell-shaped portion having a diameter greater than that of said annular spring support means and being arranged to abut and thereby limit the extent of longitudinal displacement of said spring away from said backing plate.

3. A blind-cable type parking break assembly for operating brake shoe means relative to a brake surface associated with a wheel of a vehicle, comprising:
   (a) a backing plate (502);
   (b) a parking brake lever (514) mounted for pivotal movement relative to said backing plate, said parking brake lever including annular spring support means (514a) adjacent one end thereof;
   (c) a helical guide spring (520) supported at one end by said spring support means, said spring extending, when in its initial non-compressed condition, at its other end through, and terminating at an end extremity arranged slightly beyond, and opening contained in said backing plate, the end portion (520a) of said spring other end from said spring extremity to a point on the spring intermediate said backing plate and said lever being tightly wound relative to the center portion of the spring, thereby to prevent lateral displacement of said spring relative to said backing plate;
   (d) a coaxial parking brake cable assembly including a flexible resilient inner cable member terminating at one end in an enlarged extremity; and
   (e) means connecting said inner cable member one end with said lever one end, said lever one end including a ramp portion spaced from said spring support means on the side thereof remote from said backing plate opening, said ramp portion having an inclined ramp surface facing said spring support means, said ramp portion containing a cable mounting opening so arranged and of such a size and configuration that said enlarged inner cable member extremity is operable for successive introduction through said spring, through said backing plate opening and through said spring support means into sliding engagement with said ramp portion, whereby during the blind connection of said inner cable member with said leve, the end portion of said inner cable member initially rides up said ramp portion and subsequently extends through the ramp opening for resilient return toward a connected position in which the inner cable member is retained in said mounting opening by the engagement of said enlarged extremity with the rear surface of said ramp portion;
   (f) said coaxial parking brake cable assembly also including an outer sleeve member (617), and self-connecting fitting means (650) mounted on said sleeve member for engaging said spring extremity to compress said spring longitudinally and for connecting said sleeve member with said backing plate opening.

4. Apparatus as defined in claim 3, wherein said spring support means (514a) is annular, and further wherein said spring means terminates at said one end in a second tightly-wound portion (520b) that extends within said annular support means.

* * * * *